March 15, 1966 T. O. MITCHELL ETAL 3,240,390
SOLENOID PILOT VALVE

Filed Oct. 25, 1963 3 Sheets-Sheet 1

INVENTORS
THOMAS O. MITCHELL
WILLIS WALTER SNYDER, Jr.
LOWELL F. NELSON

BY *[signature]*

ATTORNEY

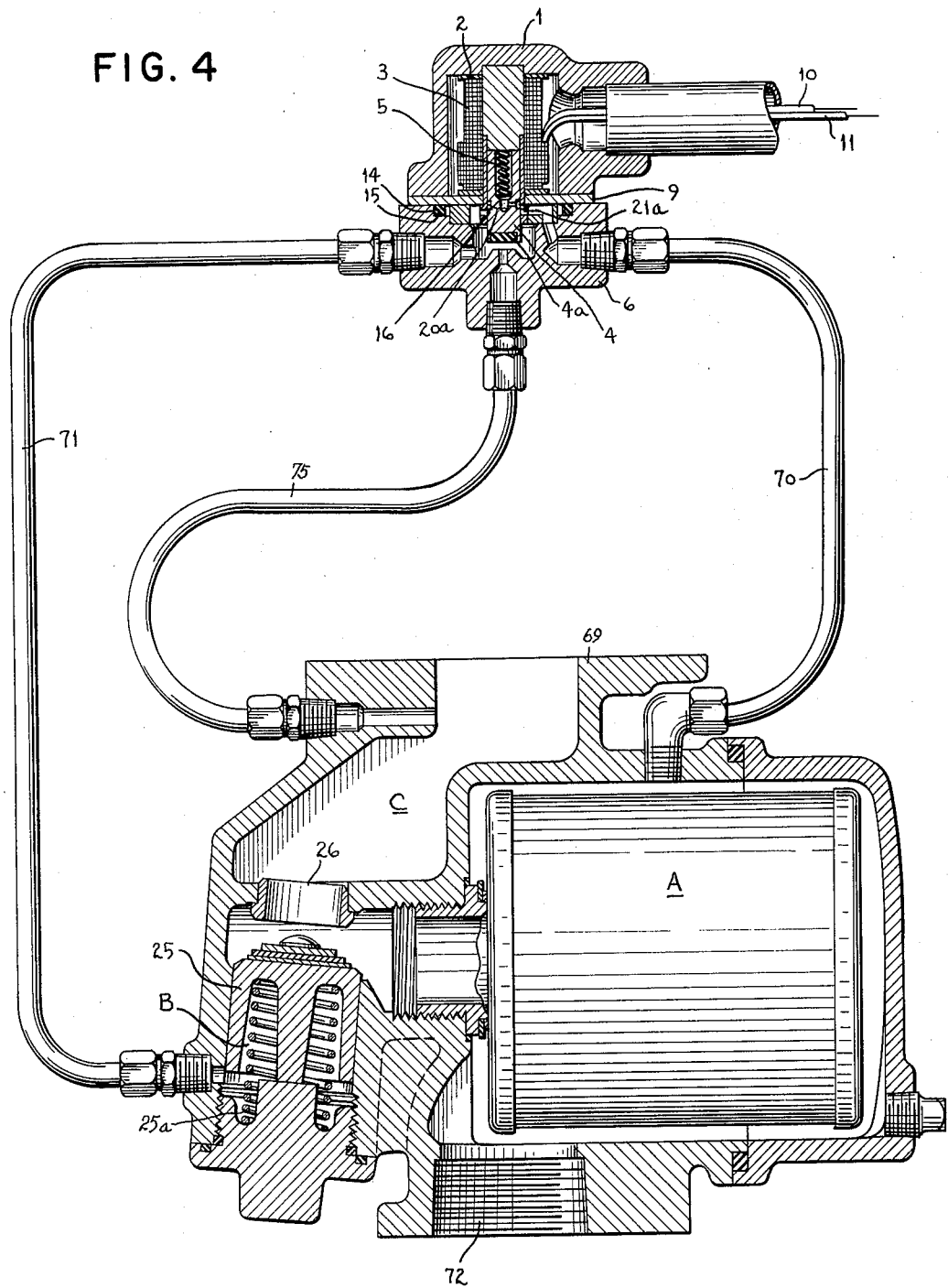

United States Patent Office 3,240,390
Patented Mar. 15, 1966

3,240,390
SOLENOID PILOT VALVE
Thomas O. Mitchell, Muskegon, Willis Walter Snyder, Jr., Montague, and Lowell F. Nelson, Muskegon, Mich., assignors to John Wood Company, New York, N.Y., a corporation of Delaware
Filed Oct. 25, 1963, Ser. No. 318,894
12 Claims. (Cl. 222—76)

Our invention relates to a solenoid operated pilot valve for effecting the opening and closing of the main valve in a gasoline pump dispenser.

The commonly presently used shut-off valve to control the flow of gasoline from a gasoline pump dispenser is operated by mechanical linkage connections by movement of the well-known switch means of the gasoline pump.

One feature of our invention is that the opening movement of the solenoid pilot valve effects the relieving of the pump pressure developed behind the main valve piston porting it to the downstream side of the liquid flow. Such opening reduces the pressure behind the piston and causes the pressure differential across the piston to effect movement of the valve off its seat, thereby allowing the liquid to flow through the valve port, and thence through a meter of well-known construction, and through the hose and discharge nozzle at the distal end of the hose.

Another feature of our invention is the use of a brazed mechanical joint between the sleeve and the solenoid core which has the effect of a shading coil, or damping ring. Such brazed joint being non-magnetic and an electrical conductor, tends to have induced in it an electrical current when exposed to the magnetic field of the coil. When this current flows in the brazed joint, a secondary field is built up out of phase with the main magnetic field around the joint, and tends to eliminate the buzzing characteristic of the plunger against the core, as is usually experienced in alternating current solenoids. It is noted that the manufacturers of most solenoids will provide a separate copper, or brass, ring set into the solenoid core for the specific purpose of reducing the inherent buzzing characteristics.

Another feature of our invention is its more economical construction, as well as far greater simplicity, which is due to the combining of the mechanical joint and the electrical inductor.

The Underwriters' Laboratories require an explosion-proof housing and specified flame path for electrical parts, and the Underwriters' Laboratories also require a liquid sealing. Another feature of our invention is the utilization of a unique system for isolating the electrical from the hydraulic sections of the unit. It is noted that most manufacturers of solenoid valves at present utilize a system of threaded joints and counterbores to create the flame path as required by Underwriters' Laboratories between electrical parts and the ambient atmosphere. At present, the hydraulic sections of most solenoid valves usually are manufactured completely separate from the electrical portions, and are isolated by threaded, gasketed, and flanged joints.

Another feature of our solenoid pilot valve is that we have used the armature and solenoid support assembly to separate the fluid carrying areas from the explosion proof electrical portions of our valves by the utilization of a single plate. The upper portion of our improved solenoid valve contains the solenoid coil and lead wires establishing a flame path between the interior and exterior areas between the flange and the body, which is secured by means of the use of machine screws at the corners. Said flange is also used in the bottom portion on the hydraulic section of the valve to prevent the flow of liquid to atmosphere as normally would be the case in the event of a leak.

Another most unique feature of our invention is the extreme simplicity and economy of manufacture in the design of our improved solenoid pilot valve.

Another feature of our invention is that the plunger includes a small counterbore at the end of the plunger into which an assembled valve disc is inserted, said valve disc being securely maintained in its position by rolling over the edge of the counterbore.

The normal swelling and shrinking characteristics of rubber products when exposed to petroleum products has no effect in the security of the fastening system disclosed. Such particular system is unique in that the assembly is so constructed that servicing may be done by replacement of the whole assembly rather than attempting to replace the valve discs in the field, if ever necessary.

Referring to said drawings, FIG. 1 is a vertical sectional view, partly in elevation, of what may be termed the preferred form of our invention.

FIG. 4 is a sectional view, partly in elevation, similar to FIG. 3, but showing the plunger and piston valve in open position.

Figure 1:
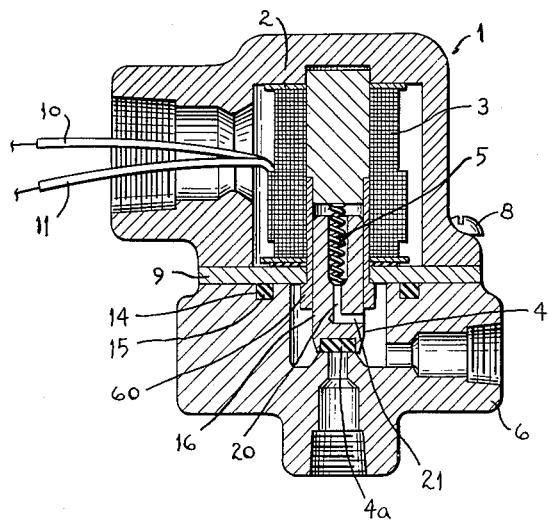
Figure 5:
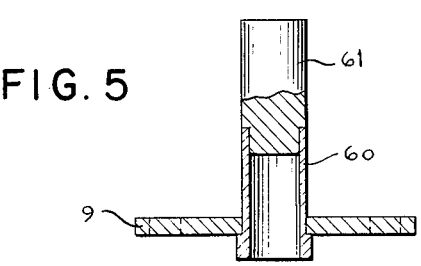
FIG. 5 is a fragmentary drawing showing more clearly the manner in which the armature and solenoid support are combined to form a brazed mechanical joint between the armature sleeve and the solenoid core with an electric effect of a shading coil.

Referring to FIG. 1 of said drawings, the solenoid operated pilot valve disclosed is an electrically actuated valve which is controlled by the well-known and commonly used motor switch in a gasoline dispenser. Said valve is a "normally closed" valve. Said valve includes the cover valve body 1 which includes an armature and solenoid portion 2 which houses the solenoid coil 3. The pilot assembly 4 includes the spring 5. The cover valve body 1 is rigidly secured to the valve body 6 by means of a series of screws 8 extending through said cover 1 and the solenoid support plate 9, brazed to the armature sleeve 60 as shown in FIG. 5, into screw threaded openings formed in the valve body 6.

The solenoid coil 3 is connected to wires 10 and 11, which are connected to a source of electrical power supply.

The valve body 6 is provided with a recess 14 in which the sealing ring 15 is positioned. It is to be noted that the seal 15 should be lubricated with oil or grease before assembly.

When the solenoid operated pilot valve is de-energized, the valve 4a at the lower end of plunger 16 is held on its seat by means of the combined forces of said spring 5 and the liquid pressure. When the conventional motor switch of the gasoline dispenser is closed, current will be directed into the solenoid coil 3, which sets up an electromagnetic field in the armature assembly, which in turn tends to attract, or induce, the pilot plunger 16 to be lifted off its seat. The plunger 16 is so designed that the liquid trapped in the armature sleeve is relieved and ported through intersecting holes 20 and 21 formed in the plunger 16.

Figure 3:
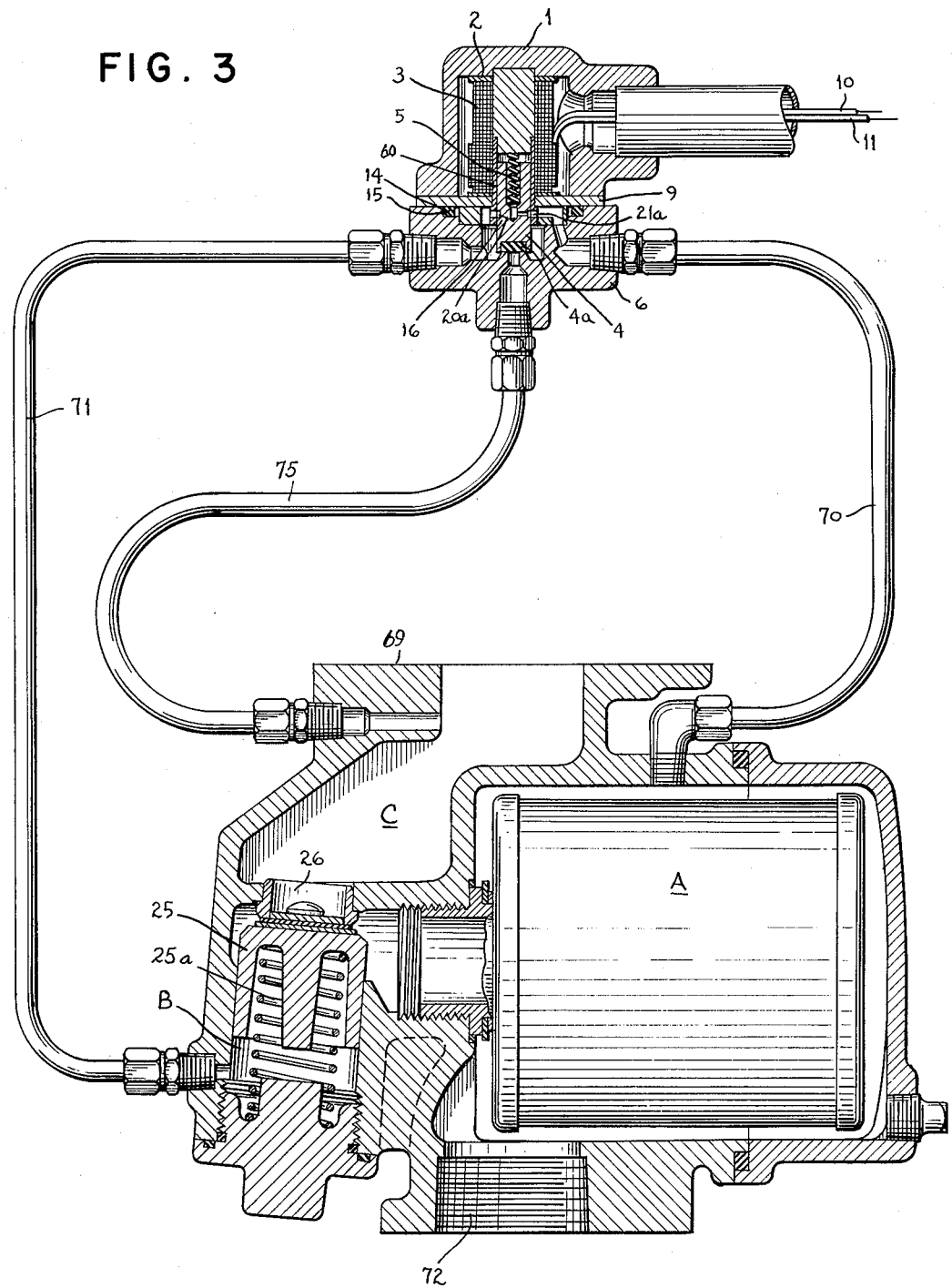
FIG. 3 is a sectional view, partly in elevation, showing the solenoid pilot valve connections to the normal piston valve of a gasoline dispenser, the dispenser piston valve being shown in closed position.

The opening of said pilot valve 4 serves to relieve the pump pressure developed behind the main valve piston 25, as shown in FIGS. 3 and 4, porting it to the downstream side of the liquid flow. This reduces the pressure behind the valve piston 25, and causes the pressure differential across the valve piston 25 to force it from the position shown in FIG. 3 to the open position shown in FIG. 4, and against the effective forces of the spring 25a urging the valve 25 to closed position. Such opening of the piston valve 25 permits the liquid to flow through the valve port 26, and thence through the meter, hose, and discharge nozzle of the well-known form of meter, hose, and discharge nozzle.

Figure 2:
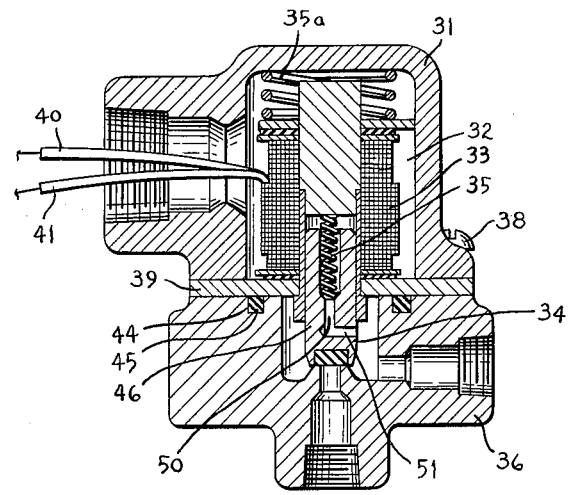
FIG. 2 is a vertical sectional view, partly in elevation, of what may be termed a modified form of our invention.

Referring to FIG. 2 of said drawings, the modified construction of solenoid operated pilot valve disclosed in an electrically actuated valve which is controlled by the commonly used motor switch in a gasoline dispenser. Said valve is a "normally closed" valve. Said valve includes the cover valve body 31 which includes an armature and solenoid portion 32 which houses the solenoid coil 33. The plunger assembly 34 includes the spring 35, and the spring 35a which holds the solenoid in its proper position endwise. The cover valve body 31 is rigidly secured to the valve body 36 by means of a series of screws 38 extending through said cover 31 and the solenoid support plate 39 into screw threaded openings formed in the valve body 36.

The solenoid coil 33 is connected to wires 40 and 41 which are connected to a source of electrical power supply.

The valve body 36 is provided with a recess 44 in which the sealing ring 45 is positioned. It is to be noted that the seal 45 should be lubricated with oil or grease before assembly.

When the solenoid operated pilot valve is de-energized, the valve of plunger 46 is held on its seat by means of the combined forces of said spring 35 and the liquid pressure. When the conventional motor switch of the gasoline dispenser is closed, current will be directed into the solenoid coil 33, which sets up an electromagnetic field in the armature assembly, which in turn tends to attract, or induce, the pilot plunger 46 to be lifted off its seat. The plunger 46 is so designed that the liquid trapped in the armature sleeve is relieved and ported through intersecting holes 50 and 51 formed in the plunger 46.

The opening of said pilot valve 34 serves to relieve the pump pressure developed behind the main valve piston 25, as shown in FIGS. 3 and 4. The opening of the pilot valve serves to relieve the pump pressure developed beneath the main piston valve 25, porting it to the downstream side of the liquid flow. This reduces the pressure behind the piston, and causes the pressure differential across the valve piston 25 to force it from the position shown in FIG. 3 to the open position shown in FIG. 4. Such opening of the piston valve 25 permits the liquid to flow through the valve port 26, and thence through the meter, hose, and discharge nozzle of the well-known form of meter, hose, and discharge nozzle.

More than one dispenser, such as shown in FIG. 3, is connected to a supply pipe, which is operatively connected to a submerged pump in a supply tank. FIG. 3 shows a dispenser which is turned off, but with another dispenser connected with the supply pipe turned on, with the pressure in the supply pipe supplied against the main piston valve 25 in FIG. 3. FIG. 4 shows the dispenser of FIG. 3 turned on, with the solenoid energized and with both the main piston valve 25 and the plunger 16 and its valve in the bottom end moved upwardly to open position.

Referring to FIGS. 3 and 4; the elements of the solenoid pilot valve shown in FIGS. 3 and 4 are substantially the same as those shown in FIG. 1, except that the plunger 16 is provided with an annular recess 20a which is adapted to be in open communication with oppositely aligned holes 21a formed in the sleeve 60, as shown in FIG. 3, when the valve 4a is closed on its valve seat. The annular recess 20a functions as a valve, and as the plunger 16 moves from the valve closed position shown in FIG. 3 to the valve open position shown in FIG. 4, the annular recess valve 20a is moved upwardly and out of communication with the aligned holes 21a in the sleeve 60.

When the solenoid is de-energized, the plunger 16 with its annular valve 20a is urged downwardly by the action of the spring 5 from the position shown in FIG. 4 to the position shown in FIG. 3, which allows the pump pressure to be applied from the filter chamber A in the main valve and filter assembly 69, through the conduit 70, through the holes 21a in the sleeve 60, the annular recess 20a, and through the conduit 71 to the chamber B in said assembly 69, to cause the main piston valve 25 to close after a short interval of time on its seat 26. The chamber C is connected by the conduit 75 to the bottom of the valve body 6 by fittings at the opposite ends of said conduit 75 into screw threaded openings in the valve body 6 and the chamber C of the main valve and filter assembly 69.

FIG. 5 is a view showing the manner in which the armature and solenoid support assembly have been combined to form a brazed mechanical joint between the armature sleeve 60 and the solenoid core 61, with an electric effect of a shading coil or damping. Such brazed joint being non-magnetic and an electrical conductor, tends to have induced in it an electrical current when exposed to the magnetic field of the coil. When the current flows in said brazed joint a secondary field is built up out of phase with the magnetic field around the joint and tends to eliminate the buzzing characteristic of the plunger against the core, as is usually experienced in alternating current solenoids. Most solenoid manufacturers provide a separate copper or brass ring set into the solenoid core specifically to reduce this buzzing characteristic.

Our novel design shows an economy of construction, as well as greater simplicity due to the combining of the mechanical joint and electrical conductor.

Due to the requirements of Underwriters' Laboratories for an explosion proof housing and specified flame path for electrical parts, and the second requirement of liquid sealing, our improved design of valve utilizes a unique system for isolating the electrical from the hydraulic sections of the unit. Most manufacturers utilize a system of threaded joints and counterbores to create the flame path as established by Underwriters' Laboratories requirements between electrical parts and the ambient atmosphere. The hydraulic sections of said valves usually are manufactured completely separately from the electrical portions, and are isolated by means of threaded, gasketed, and flange joints.

In the design of our improved pilot valve, we have used armature and solenoid support assembly to separate the fluid carrying areas from the explosion proof electrical portions of the valve by means of a single support plate, such as indicated at 9 in FIG. 5. The upper portion of the valve containing the solenoid coil and electrical lead wires establishes its flame path between the interior and exterior areas between the flange of the assembly and the cover body 1, and is secured by means of four machine screws at the corners, one of which is indicated at 8 in FIG. 1. The same flange on the assembly is used in the bottom portion of the hydraulic section of the valve to prevent the flow of liquid to the outside as would be evidenced by a leak. A square section "O" ring, or a round "O" ring, as indicated at 15 in FIG. 1, is used in the body portion 6, and is secured by said four machine screws 8 mentioned supra. Such a construction is characterized by its uniqueness, and utilizes extreme simplicity and economy of manufacture as effected by the type of construction disclosed.

Most manufacturers of solenoids utilize magnetic paths separate from the explosion proof housing of their electrical parts, or use a construction which is rather complex which makes the manufacture and service expensive.

Our improved pilot valve is so constructed so that the cover 1 and assembly 3 are brought into magnetic proximity at the top of the cover. Such a construction provides a continuous magnetic path up to the armature assembly, washer, etc., directly into the cover and back around into the armature assembly.

Valve discs such as indicated at 4a would normally tend to be loosened by the surge of fluid when the valve opens. Most manufacturers use complicated interlocking systems for the rubber valve discs and the plunger, or use a separate fastener to hold the valve discs in the plunger or plunger assembly. In our improved plunger design we have used a small counterbore in the end of the plunger into which there is assembled a valve disc 4a. The edge of said counterbore plunger is rolled over to securely contain the valve discs 4a in its counterbore by the rolling over of the metal.

The normal swelling and shrinking characteristics of the rubber products such as the valve disc when exposed to petroleum products has no effect in the securing of such fastening means as we have shown and described. Our particular system is unique in that the assembly is so constructed that servicing may be done facilely by replacement of the whole assembly, rather than by attempting to replace a valve disc in the field, if such replacement should be necessary.

When the gasoline pump dispenser is turned off and electric current is not flowing through the solenoid coil 3, the plunger 16 is held on its seat in the valve body by the spring 5. The inlet pressure is applied through tubes 70 and 71 connecting chambers A and B in the valve and filter assembly 69 through tapped holes in the valve body 6. Pressure in chambers A and B is equalized first through matching passageways in the valve and pin assembly, the armature and solenoid support assembly, and the plunger 16; secondly, the clearance space between the piston valve and the cylinder bore in the body of the valve and filter assembly 69.

When the gasoline pump dispenser is turned on and electric current energizes the solenoid 3, the plunger 16, with the disc 4a, lifts off its seat in the valve body 6. As the plunger 16 moves off its seat, it also closes the ports in the armature and solenoid support assembly, which closes the passage between the chambers A and B. The pressure in chamber B is reduced, since raising the plunger opens a passageway between chamber C on the discharge side of the valve and filter assembly 69 and chamber B. A pressure differential is established between chambers A and B, which causes the piston valve to open. FIG. 4 shows the position of the ports when the gasoline pump dispenser is turned on, and the plunger and piston valve are opened, with the piston valve 25 moved off its seat 26.

Figure 6:
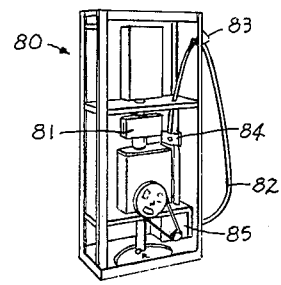
FIG. 6 is a small size elevation view of a gasoline pump dispenser of the well known type which is in common use in service stations, but with the outer housing removed to show the various well known and commonly used meter, hose, discharge nozzle, electrical switch means, and the electrical motor elements.

Referring to FIG. 6 showing diagrammatically a gasoline pump dispenser, indicated generally at 80, of the well known type which has been in common use in service stations for a long period of years; such a unit includes a meter 81 connected at its outlet by suitable conduit means to a flexible dispensing hose 82, the distal end of which is connected to a dispensing nozzle 83. The unit 80 includes electrical switch means 84 (operated by any convenient means of the well known types positioned exteriorly of the housing for the unit) connected to an electric motor 85 which drives the pumping unit of the gasoline pump dispenser.

*Operation*

The operation of the solenoid operated pilot valve as shown in FIG. 1 is the same as that shown in FIGS. 3 and 4, except that the conduit 70 shown in FIGS. 3 and 4 is not utilized in connection with the valve as shown in FIG. 1.

Referring to the operation of the construction shown in FIGS. 3 and 4; as stated above, FIG. 3 shows a dispenser which is turned off, but with another dispenser connected to the supply pipe turned on, with the pressure in the supply pipe applied against the main piston valve 25 in the main valve and filter assembly 69. When valve 25 is moved to closed position on its seat 26, it is a close diametral fit between the valve and that portion of the main valve and filter assembly 69 in which the valve 25 is positioned. Such close fit allows the pump pressure to be applied to the chamber B and, with the assistance of spring 25a, maintains the valve 25 closed on its seat 26.

The pressure in chamber C is lower than the pressure in chambers A and B. When the valve 25 is closed, the construction shown in FIG. 1, correspondingly, would be closed and its solenoid de-energized. Valve 4a, in FIG. 1, is held on its seat by the action of the spring 5 and the pressure from the chamber B acting through a conduit similar to conduit 71 shown in FIGS. 3 and 4.

When it is desired to dispense gasoline through the main valve and filter assembly 69 into the discharge opening of the chamber C as shown in FIGS. 3 and 4, and from said discharge opening to a well-known type of meter (not shown) positioned on top of the assembly 69 and a dispensing hose and nozzle (not shown) connected to said meter; the pump is turned on in the normal manner which actuates the electric switch means to closed position, and energizes the solenoid coil 3 in FIGS. 1, 3, and 4, or 32 in FIG. 2, which moves the valve 4a at the end of plunger 16 in FIGS. 1, 3, and 4, or 46 in FIG. 2, off its seat. The high pressure in chamber B is dissipated through conduit 71, past the open valve 4a, and through the conduit 75 to chamber C. The differential pressure operating on valve 25 allows valve 25 to open, and gasoline (or other fluid) to flow freely from chamber A, through valve seat 26 into chamber C, and thence to the meter, etc.

The close diametral fit between valve 25 and its opening in said main valve and filter assembly 69 assures a pressure differential to maintain said valve 25 open as long as the solenoid coil is energized. When the solenoid coil 3 is de-energized, the plunger 16 is moved downwardly by its spring 5 and the valve 4a at the lower end of the plunger 16 is moved to closed position on its valve seat, thus preventing fluid to flow through said conduit 75. Such closure of the valve 4a permits the spring 25a to move the valve 25 to closed position on its valve seat 26.

Referring particularly to FIGS. 3 and 4, closure of the valve 4a on its seat permits pump pressure to be applied from chamber A through conduit 70, through the holes 21a in said sleeve 60 and the annular recess valve 20a, through the conduit 71 to chamber B to effect instantaneous closure of said valve 25 on its seat 26.

We do not desire to limit ourselves to the precise details of construction and arrangement herein disclosed, as it is obvious that various modifications may be made therein without departing from the essential features of our invention, as defined in the appended claims.

We claim:

1. In a liquid dispensing pump unit which includes a meter, hose, discharge nozzle, electrical switch means for controlling the operation of an electric motor operatively connected to a pump means, and a main shut-off valve; an electrically actuated, normally closed, solenoid pilot valve operatively controlled by said electric motor switch means; means operatively connecting said solenoid pilot valve with said main shut-off valve to effect opening and closing after a short time delay of said main shut-off valve; said solenoid pilot valve including an outer housing; a solenoid coil armature; a support for said solenoid armature assembly; a sleeve in the core of said solenoid armature assembly; a plunger adapted to be reciprocated in said sleeve; a valve means at the end of said plunger; spring means in an axial recess formed in the upper portion of said plunger, said spring means being adapted to maintain said valve means of said plunger closed on its valve seat when said solenoid armature is de-energized; and wiring means connecting said solenoid armature with said electric motor switch means, which switch means is connected to a source of electrical power supply.

2. In a gasoline dispensing pump unit which includes a meter, hose, discharge nozzle, electrical switch means for controlling the operation of an electric motor operatively connected to a pump means, and a main shut-off valve; an electrically actuated, normally closed, solenoid pilot valve operatively controlled by said electric motor switch means; means operatively connecting said solenoid pilot valve with said main shut-off valve to effect opening and closing after a short time delay of said main shut-off valve; said solenoid pilot valve including an outer housing; a solenoid coil armature; a support for said solenoid armature assembly; a sleeve in the core of said solenoid armature assembly, said sleeve being brazed to said core to form a brazed mechanical joint between said sleeve and said solenoid core; a plunger adapted to be reciprocated in said sleeve; a valve means at the end of said plunger; spring means in an axial recess formed in the upper portion of said plunger, said spring means being adapted to maintain said valve means of said plunger closed on its valve seat when said solenoid armature is de-energized; and wiring means connecting said solenoid armature with said electric motor switch means, which switch means is connected to a source of electrical power supply; whereby, said brazed mechanical joint induces an electric effect of a shading coil, or damping ring, said brazed mechanical joint being non-magnetic and an electrical conductor tends to have induced in it an electrical current when exposed to the magnetic field of said solenoid coil, said current flow in said brazed joint building up a secondary field which is out of phase with the main magnetic field around the joint and tends to eliminate the buzzing characteristic of a plunger against a core as is usually experienced in alternating current solenoids.

3. In a gasoline dispensing pump unit which includes a meter, hose, discharge nozzle, electrical switch means for controlling the operation of an electric motor operatively connected to a pump means, and a main shut-off valve; an electrically actuated, normally closed, solenoid pilot valve operatively controlled by said electric motor switch means; means operatively connecting said solenoid pilot valve with said main shut-off valve to effect opening and closing after a short time delay of said main shut-off valve; said solenoid pilot valve including an outer housing; a solenoid coil armature; a support for said solenoid armaturue assembly, said support being tightly clamped between the upper portion of said solenoid pilot valve housing containing the electrical elements and the lower portion of said housing containing the hydraulic elements of the unit, said lower portion of said housing being provided at its upper surface with a groove containing a sealing ring element, thereby isolating the electrical portions from the hydraulic portions of said solenoid pilot valve; a sleeve in the core of said solenoid armature assembly, said sleeve being brazed to said core to form a brazed mechanical joint between said sleeve and said solenoid core; a plunger adapted to be reciprocated in said sleeve; a valve means at the end of said plunger; spring means in an axial recess formed in the upper portion of said plunger, said spring means being adapted to maintain said valve means of said plunger closed on its valve seat when said solenoid armature is de-energized; and wiring means connecting said solenoid armature with said electric motor switch means, which switch means is connected to a source of electrical power supply; whereby said brazed mechanical joint induces an electric effect of a shading coil, or damping ring, said brazed mechanical joint being non-magnetic and an electrical conductor tends to have induced in it an electrical current when exposed to the magnetic field of said solenoid coil, said current flow in said brazed joint building up a secondary field which is out of phase with the main magnetic field around the joint and tends to eliminate the buzzing characteristic of a plunger against a core as is usually experienced in alternating current solenoids.

4. In a gasoline dispensing pump unit which includes a meter, hose, discharge nozzle, electrical switch means for controlling the operation of an electric motor operatively connected to a pump means, and a main shut-off valve; an electrically actuated, normally closed, solenoid pilot valve operatively controlled by said electric motor switch means; means operatively connecting said solenoid pilot valve with said main shut-off valve to effect opening and closing after a short time delay of said main shut-off valve; said solenoid pilot valve including an outer housing; a solenoid coil armature; a support for said solenoid armature assembly, said support being tightly clamped between the upper portion of said solenoid pilot valve housing containing the electrical elements and the lower portion of said housing containing the hydraulic elements of the unit, said lower portion of said housing being provided at its upper surface with a groove containing a sealing ring element, thereby isolating the electrical portions from the hydraulic portions of said solenoid pilot valve; a sleeve in the core of said solenoid armature assembly; a plunger adapted to be reciprocated in said sleeve, said plunger being provided with intersecting drilled openings to relieve and port any liquid trapped in the armature sleeve; a valve means at the end of said plunger; spring means in an axial recess formed in the upper portion of said plunger, said spring means being adapted to maintain said valve means of said plunger closed on its valve seat when said solenoid armature is de-energized; and wiring means connecting said solenoid armature with said electric motor switch means, which switch means is connected to a source of electrical power supply; whereby, said brazed mechanical joint induces an electric effect of a shading coil, or damping ring, said brazed mechanical joint being non-magnetic and an electrical conductor tends to have induced in it an electrical current when exposed to the magnetic field of said solenoid coil, said current flow in said brazed joint building up a secondary field which is out of phase with the main magnetic field around the joint and tends to eliminate the buzzing characteristic of a plunger against a core as is usually experienced in alternating current solenoids.

5. A structure as in claim 1; which includes a washer at the top of said solenoid coil armature; and a second spring, the bottom of which is in engagement with the top surface of said washer and the top of said second spring is in engagement with the inside surface of the top of said outer housing, said second spring bringing said solenoid coil armature and said outer housing into magnetic proximity to provide a continuous magnetic path through said solenoid armature, said washer, said second spring, and said top of said outer housing, and back around into said solenoid coil armature.

6. A structure as in claim 2; which includes a washer at the top of said solenoid coil armature; and a second spring, the bottom of which is in engagement with the top surface of said washer and the top of said second spring is in engagement with the inside surface of the top of said outer housing, said second spring bringing said solenoid coil armature and said outer housing into magnetic proximity to provide a continuous magnetic path through said solenoid armature, said washer, said second spring, and said top of said outer housing, and back around into said solenoid coil armature.

7. A structure as in claim 3; which includes a washer at the top of said solenoid coil armature; and a second spring, the bottom of which is in engagement with the top surface of said washer and the top of said second spring is in engagement with the inside surface of the top of said outer housing, said second spring bringing said solenoid coil armature and said outer housing into magnetic proximity to provide a continuous magnetic path through said solenoid armature, said washer, said second spring, and said top of said outer housing, and back around into said solenoid coil armature.

8. A structure as in claim 4; which includes a washer at the top of said solenoid coil armature; and a second spring, the bottom of which is in engagement with the top surface of said washer and the top of said second spring is in engagement with the inside surface of the top of said outer housing, said second spring bringing said solenoid coil armature and said outer housing into magnetic proximity to provide a continuous magnetic path through said solenoid armature, said washer, said second spring, and said top of said outer housing, and back around into said solenoid coil armature.

9. In a liquid dispensing pump unit which includes a meter, hose, discharge nozzle, electrical switch means for controlling the operation of an electrical motor operatively connected to a pump means, and a main shut-off valve in a filter and valve assembly unit; an electrically actuated, normally closed, solenoid pilot valve operatively controlled by said electric motor switch means; conduit means operatively connecting said solenoid pilot valve with said main shut-off valve to effect opening and closing after a short time delay of said main shut-off valve; said solenoid pilot valve including an outer housing; a solenoid coil and plunger assembly; a support for said solenoid assembly; a sleeve in the core of said solenoid assembly, said sleeve being provided at its lower part with oppositely aligned holes therethrough; a plunger adapted to be reciprocated in said sleeve, said plunger being provided at its lower part with an annular recess valve means, said annular recess valve means being in open communication with said holes in said sleeve when said plunger is moved downwardly to cause valve means at the end of said plunger to be closed on its valve seat; spring means in an axial recess formed in the upper portion of said plunger, said spring means being adapted to maintain said valve means of said plunger closed on its valve seat when said solenoid coil is de-energized; and wiring means connecting said solenoid coil with said electric motor switch means, which switch means is connected to a source of electrical power supply; whereby, when said solenoid coil is de-energized, and said valve in the lower end of said plunger is closed on its seat, pump pressure is applied by conduit means from the chamber in the filter portion of said valve and filter assembly through said holes in said sleeve and said piston annular recess valve, and thence by conduit means to a chamber beneath said main shut-off valve to cause said main shut-off valve to move instantaneously to closed position on its valve seat.

10. In a liquid dispensing pump unit which includes a meter, hose, discharge nozzle, electrical switch means for controlling the operation of an electric motor operatively connected to a pump means, and a spring loaded main shut-off valve in a filter and valve assembly unit; an electrically actuated, normally closed, solenoid pilot valve operatively controlled by said electric motor switch means; conduit means operatively connecting said solenoid pilot valve with a chamber beneath said main shut-off valve to effect opening and closing after a short time delay of said main shut-off valve; said solenoid pilot valve including an outer housing; a solenoid coil and plunger assembly; a support for said solenoid assembly; a sleeve in the core of said solenoid assembly, said sleeve being provided at its lower part with oppositely aligned holes therethrough; a plunger adapted to be reciprocated in said sleeve, said plunger being provided at its lower part with an annular recess valve means, said annular recess valve means being in open communication with said holes in said sleeve when said plunger is moved downwardly to cause valve means at the end of said plunger to be closed on its valve seat; spring means in an axial recess formed in the upper portion of said plunger, said spring means being adapted to maintain said valve means of said plunger closed on its valve seat when said solenoid coil is de-energized; and wiring means connecting said solenoid coil with said electric motor switch means, which switch means is connected to a source of electrical power supply; whereby, when said solenoid coil is de-energized, and said valve in the lower end of said plunger is closed on its seat, pump pressure is applied by conduit means from the chamber in the filter portion of said valve and filter assembly through said holes in said sleeve and said piston annular recess valve, and thence by conduit means to a chamber beneath said main shut-off valve to cause said main shut-off valve to move instantaneously to closed position on its valve seat.

11. In a liquid dispensing pump unit which includes a meter, hose, discharge nozzle, electrical switch means for controlling the operation of an electric motor operatively connected to a pump means, and a spring loaded main shut-off valve in a filter and valve assembly unit; an electrically actuated, normally closed, solenoid pilot valve operatively controlled by said electric motor switch means; conduit means operatively connecting a chamber surrounding the lower portion of the plunger of said solenoid pilot valve with a chamber beneath said main shut-off valve to effect openings and closing after a short time delay of said main shut-off valve; said solenoid pilot valve including an outer housing; a solenoid coil and plunger assembly; a support for said solenoid assembly; a sleeve in the core of said solenoid assembly, said sleeve being provided at its lower part with oppositely aligned holes therethrough; a plunger adapted to be reciprocated in said sleeve, said plunger being provided at its lower part with an annular recess valve means, said annular recess valve means being in open communication with said holes in said sleeve when said plunger is moved downwardly to cause valve means at the end of said plunger to be closed on its valve seat; spring means in an axial recess formed in the upper portion of said plunger, said spring means being adapted to maintain said valve means of said plunger closed on its valve seat when said solenoid coil is de-energized; and wiring means connecting said solenoid coil with said electric motor switch means, which switch means is connected to a source of electrical power supply; whereby, when said solenoid coil is de-energized, and said valve in the lower end of said plunger is closed on its seat, pump pressure is applied by conduit means from the chamber in the filter portion of said valve and filter assembly through said holes in said sleeve and said piston annular recess valve, and thence by conduit means to a chamber beneath said main shut-off valve to cause said main shut-off valve to move instantaneously to closed position on its valve seat.

12. In a liquid dispensing pump unit which includes a meter, hose, discharge nozzle, electrical switch means for controlling the operation of an electric motor operatively connected to a pump means, and a spring loaded main shut-off valve in a filter and valve assembly unit; an electrically actuated, normally closed, solenoid pilot valve operatively controlled by said electric motor switch means; conduit means operatively connecting a chamber surrounding the lower portion of the plunger of said solenoid pilot valve with a chamber beneath said main shut-off valve to effect opening and closing after a short time delay of said main shut-off valve; said solenoid pilot valve including an outer housing; a solenoid coil and plunger assembly; a support for said solenoid assembly; a sleeve in the core of said solenoid assembly, said sleeve being provided at its lower part with oppositely aligned holes therethrough; a plunger adapted to be reciprocated in said sleeve, said plunger being provided at its lower part with an annular recess valve means, said annular recess valve means being in open communication with said holes in said sleeve when said plunger is moved downwardly to cause valve means at the end of said plunger to be closed on its valve seat; a second conduit means operatively connecting said chamber surrounding said plunger with a discharge chamber formed in the upper part of said filter and valve assembly unit; spring means in an axial recess formed in the upper portion of said plunger, said spring means being adapted to maintain said valve means of said plunger closed on its valve seat when said solenoid coil is de-energized; and wiring means connecting said solenoid coil with said electric motor switch means, which switch means is connected to a source of electrical power supply; whereby, when said solenoid coil is de-energized, and said valve in the lower end of said plunger is closed on its seat, pump pressure is applied by conduit means from the chamber in the filter portion of said valve and filter assembly through said holes in said sleeve and said piston annular recess valve, and thence by conduit means to a chamber beneath said main shut-off valve to cause said main shut-off valve to move instantaneously to closed position on its valve seat.

References Cited by the Examiner
UNITED STATES PATENTS

| | | | |
|---|---|---|---|
| 2,942,759 | 6/1960 | Wright | 222—74 X |
| 2,965,268 | 12/1960 | Bauerlein | 222—504 X |

LOUIS J. DEMBO, *Primary Examiner.*